(12) United States Patent
Kang et al.

(10) Patent No.: US 11,133,931 B2
(45) Date of Patent: Sep. 28, 2021

(54) SECURITY SERVICE PROVIDING APPARATUS AND METHOD FOR SUPPORTING LIGHTWEIGHT SECURITY SCHEME

(71) Applicant: GREEN IT KOREA CO., LTD., Namyangju-si (KR)

(72) Inventors: Won Sig Kang, Seoul (KR); Chang Seop Park, Seongnam-si (KR)

(73) Assignee: GREEN IT KOREA CO., LTD., Namyangju-si (KR)

( * ) Notice: Subject to any disclaimer, the term of this patent is extended or adjusted under 35 U.S.C. 154(b) by 204 days.

(21) Appl. No.: 16/683,240

(22) Filed: Nov. 13, 2019

(65) Prior Publication Data
US 2020/0213106 A1  Jul. 2, 2020

(30) Foreign Application Priority Data
Dec. 28, 2018 (KR) .................. 10-2018-0172906

(51) Int. Cl.
| | |
|---|---|
| *H04L 29/06* | (2006.01) |
| *H04L 9/08* | (2006.01) |
| *H04L 9/06* | (2006.01) |
| *H04L 9/32* | (2006.01) |

(52) U.S. Cl.
CPC .......... *H04L 9/0872* (2013.01); *H04L 9/0643* (2013.01); *H04L 9/32* (2013.01); *H04L 2209/38* (2013.01)

(58) Field of Classification Search
CPC ... H04L 9/0643; H04L 9/0872; H04L 9/0866; H04L 9/12; H04L 9/32; H04L 9/3239; H04L 2209/38; H04L 2209/805
See application file for complete search history.

(56) References Cited

U.S. PATENT DOCUMENTS

| | | | |
|---|---|---|---|
| 2005/0114666 A1* | 5/2005 | Sudia ................. | H04L 9/3247 713/175 |
| 2018/0041345 A1* | 2/2018 | Maim .................. | G06F 21/51 |
| 2020/0193047 A1* | 6/2020 | Moore ................ | H04L 63/104 |

* cited by examiner

*Primary Examiner* — Kevin Bechtel
*Assistant Examiner* — Hany S. Gadalla
(74) *Attorney, Agent, or Firm* — Rabin & Berdo, P.C.

(57) ABSTRACT

The present invention relates to security service providing apparatus and method for supporting lightweight security which provides lightweight security by using an error coefficient and a hash of a chain block used for time synchronization with the terminal for generation of an encryption key to improve security complexity while securing security for communication with terminals and also securing security for an encryption key through the blockchain. According to the present invention, for security for the communication session between the service providing apparatus and the terminal, the encryption key of the terminal is generated as the hash through the hash algorithm by combining the time difference generated in the time synchronization process with the terminal and the hash generated based on the information related to the encryption key of the other terminal stored in the blockchain to generate a symmetrical encryption key which cannot be inferred and has high security.

10 Claims, 6 Drawing Sheets

Generate key:
1:  compute time-difference_new from difference(base-time, comparison-time)
2:  compute salt-value from hashsha1(time-difference_new with keymap-hash_1)
3:  generate symmetric-key_new from hash(salt-value with magic-number)
4:  if (symmetric-key_new ≠ wrong) then
5:      store symmetric-key_new to policy field of immutable ledger
6:      return symmetric-key_new
7:  else
8:      return error
9:  end if

FIG. 6

Key validation:
10:  request keymap-hash$_1$ to BC server
11:  compute slat-value from hash(time-difference$_{stored}$ with keymap-hash$_1$)
12:  generate symmetric-key$_{calc}$ from hash(salt-value with magic-number)
13:  if (symmetric-key$_{new}$ = symmetric-key$_{calc}$) then
14:      return true
15:  else
16:      return false
17:  end if

FIG. 7

Encryption:
18:  if (valid(plain-data) and valid(symmetric-key)) then
19:      encrypt plain-data from algorithm with LEA$_{enc}$(plain-data, symmetric-key)
20:      if (is success) then
21:          return cipher-data
22:      else
23:          return false
24:      end if
25:  else
26:      return false;
27:  end if

FIG. 8

Decryption:
28:  if (valid(cipher-data)) then
29:      decrypt cipher-data from algorithm with LEA$_{dec}$(cipher-data, symmetric-key)
30:      if (is success) then
31:          return plain-data
32:      else
33:          return false
34:      end if
35:  end if

FIG. 9

SECURITY SERVICE PROVIDING APPARATUS AND METHOD FOR SUPPORTING LIGHTWEIGHT SECURITY SCHEME

CROSS-REFERENCE TO RELATED APPLICATIONS

This application claims the priority of Korean Patent Application No. 10-2018-0172906 filed on Dec. 28, 2018, in the Korean Intellectual Property Office, the disclosure of which is incorporated herein by reference.

BACKGROUND OF THE INVENTION

Field of the Invention

The present invention relates to security service providing apparatus and method for supporting a lightweight security scheme and more particularly, to security service providing apparatus and method for supporting a lightweight security scheme capable of providing lightweight security by using an error coefficient and a hash of a chain block used for time synchronization with the terminal for generation of an encryption key to improve security complexity while securing security for communication with terminals and also securing security for an encryption key through the blockchain.

Description of the Related Art

Currently, various security schemes have appeared for the security of data transmitted and received between devices configuring a variety of systems such as a video surveillance system or an IoT system and such data security is directly related to the reliability of data and thus the importance thereof has been gradually increased.

However, in existing encryption schemes, the complexity is considerable, and thus a hardware configuration of supporting the corresponding encryption schemes are possible in a serve managing the system, but there is a problem in that it is difficult to support a security protocol when a terminating device communicating with the service in the corresponding system is a low-performance device.

Even if the hardware configuration of supporting the security protocol is possible in such a terminating device, in communication with the server, a load applied to the terminating device is considerable, and thus there is a high possibility that communication failures and communication delays occur due to the load, and as a result, there is a problem in that stability and reliability of the system are deteriorated.

SUMMARY OF THE INVENTION

An object of the present invention is to be easily applied to a terminal even when the terminal configuring a system is constituted by a low-performance device and securing stability and reliability of the system by a processing load of the terminal related with the security as well as securing the security for a communication session with the terminal stably by proving a lightweight security scheme using a symmetrical encryption key.

Further, another object of the present invention is to secure security for an overall system by securing the security for the encryption key by easily detecting the forgery of a symmetrical encryption key to be used in communication with the terminal.

According to an embodiment of the present invention, a security service providing method for supporting a lightweight security scheme may comprise: a synchronization step of performing, by a service providing apparatus, time synchronization with a specific terminal according to a predetermined synchronization protocol; an identification step of identifying, by the service providing apparatus, a previous block to be connected to a new block associated with an encryption key of the specific terminal in a pre-stored shared ledger used for a block chain to generate the encryption key of the specific terminal; a generation step of extracting, by the service providing apparatus, an existing key block hash value obtained by applying a hash value used for generating the other encryption key related to the other terminal, information related to the other encryption key including identification information of the other terminal and the other encryption key related to the other terminal, and a generation time of the existing key block to a predetermined hash algorithm in an existing key block which is included in the previous block and stores the information related to the other encryption key of the other terminal and generating the encryption key by applying an error coefficient according to a time difference from the specific terminal measured through the time synchronization and the existing key block hash value to a predetermined hash algorithm; a transmission step of transmitting, by the service providing apparatus, the existing key block hash value to generate the encryption key in the specific terminal; and a security step of encrypting and transmitting, by the service providing apparatus, transmission data with the encryption key to the specific terminal generating the encryption key or decrypting reception data encrypted with the encryption key received from the specific terminal with the encryption key.

As an example of the present invention, the encryption key may be a symmetrical key.

As an example of the present invention, the synchronization protocol may be an NTP.

As an example of the present invention, the security service providing method may further comprise generating, by the specific terminal receiving the existing key block hash value from the service providing apparatus, the encryption key based on the existing key block hash value and the error coefficient measured in a process of performing the synchronization with the service providing apparatus.

As an example of the present invention, the generation step may be configured by a step of generating, by the service providing apparatus, a first random number value obtained by applying the existing key block hash value extracted from the existing key block and the error coefficient according to the time difference measured through the time synchronization to the hash algorithm and a second random number value obtained by applying a predetermined unique set value to the hash algorithm again, and further comprise a step of generating, by the specific terminal, a first random number value generated by applying the existing key block hash value and the error coefficient received from the service providing apparatus and a second random number value obtained by applying the predetermined unique set value received from the service providing apparatus to the hash algorithm again and then verifying whether the generated encryption key is the same as the encryption key generated by the service providing apparatus.

As an example of the present invention, the security service providing method may further comprise a step of generating, by the service providing apparatus, a new block to be connected to the previous block based on one or more transactions generated in relation to the encryption key of the specific terminal, generating a new key block including a new key block hash value obtained by applying the existing key block hash value used for generating the encryption key for the specific terminal when the new block is generated, a generation time of the new key block including the encryption key-related information including identification information of the specific terminal and the encryption key related to the specific terminal, and the encryption key-related information to the hash algorithm and including the new key block in the new block, and then registering the new block in the shared ledger so that the existing key block corresponding to the existing key block hash value included in the previous block and the new key block are connected to each other.

As an example of the present invention, the registration step may further comprise a step of generating, by the service providing apparatus, a root hash value for determining the forgery of the new block based on one or more transactions generated in relation to the encryption key of the specific terminal for the generation period of the new block and a hash value for each of the one or more transactions generated in relation to data transmitted and received through communication with one or more other terminals and generating a block hash value for connecting the new block with the previous block based on the block hash value of the previous block and the root hash value to include the block hash value in the new block and then registering the new block in the shared ledger so as to be connected to the previous block.

As an example of the present invention, the security service providing method may further comprise adding, by the service providing apparatus, discard information related to the encryption key to be discarded in a specific key block generated when the encryption key is discarded to the specific key block when the encryption key is deleted and discarded after the encryption key of the specific terminal is generated, calculating a key block hash value of the specific key block by applying the discard information to the hash algorithm together with a key block hash value for the key block before the specific key block included in the specific key block, identification information for each of one or more terminals corresponding to the specific key block, one or more different new encryption keys corresponding to the specific key block, and a generation time of the specific key block, setting a key block hash value reflected with the discard information in the specific key block and then registering and storing the specific key block including the discard information in the shared ledger, and generating a new encryption key corresponding to the specific terminal by performing the synchronization step, the identification step, the generation step, and the transmission step for the specific terminal in which the encryption key is discarded.

According to another embodiment of the present invention, a security service providing apparatus for communicating with a plurality of different terminals via a communication network and supporting a lightweight security scheme may comprise: a synchronization unit configured to perform time synchronization with a specific terminal according to a predetermined synchronization protocol; an encryption key generation unit configured to identify a previous block to be connected with a new block associated with an encryption key of the specific terminal in a pre-stored shared ledger sued in the block chain in order to generate the encryption key of the specific terminal, extract an existing key block hash value obtained by applying the hash value used for generating the other encryption key related to the other terminal, the information related to the other encryption key including the identification information of the other terminal and the other encryption key related to the other terminal, and the generation time of the existing key block to a predetermined hash algorithm in the existing key block which is included in the previous block and stores the information related to the other encryption key of the other terminal, generate an encryption key for the specific terminal by applying an error coefficient according to a time difference from the specific terminal measured through the time synchronization and the existing key block hash value to the predetermined hash value algorithm, and transmit the existing key block hash value so as to generate the same encryption key in the specific terminal; and an encryption/decryption unit configured to encrypt and transmit transmission data with the encryption key to the specific terminal generating the encryption key or decrypt reception data encrypted with the encryption key received from the specific terminal with the encryption key.

As an example of the present invention, the security service providing apparatus may further comprise a blockchain management unit configured to generate a new block to be connected to the previous block based on one or more transactions generated in relation to the encryption key of the specific terminal, generate a new key block including a new key block hash value obtained by applying the existing key block hash value used for generating the encryption key for the specific terminal when the new block is generated, a generation time of the new key block including the encryption key-related information including identification information of the specific terminal and the encryption key related to the specific terminal, and the encryption key-related information to the hash algorithm and include the new key block in the new block, and then register the new block in the shared ledger so that the existing key block corresponding to the existing key block hash value included in the previous block and the new key block are connected to each other.

According to the present invention, for security for the communication session between the service providing apparatus and the terminal, the encryption key of the terminal is generated as the hash through the hash algorithm by combining the time difference generated in the time synchronization process with the terminal and the hash generated based on the information related to the encryption key of the other terminal stored in the blockchain to generate a symmetrical encryption key which cannot be inferred and has high security. As a result, the present invention supports so that the data transmitted and received through the communication session is encrypted to provide a lightweight security scheme using a symmetrical encryption key configured as a hash and having high security, thereby safely securing the security for the communication session with the terminal and to lower a processing load of the terminal in relation to the security, thereby securing high security and reliability in relation to the transmission and reception data which are easily applicable even when the terminal is configured as a low-performance device.

Further, the present invention uses the blockchain to confirm the forgery of the encryption key, but supports the forgery to be easily detected when the forgery for the encryption key-related information as well as the encryption key occurs by generating a separate key block for confirming the forgery of the encryption key-related information distinguished from the block using the information used in the generation process of the encryption key and the identification information and the encryption key of the terminal corresponding to the encryption key even in addition to the block generated based on the transaction generated in the generation process of the encryption key, thereby enhancing the security for the encryption key used for the encryption of the communication session.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, detailed embodiments of the present invention will be described with reference to the drawings.

Figure 1:
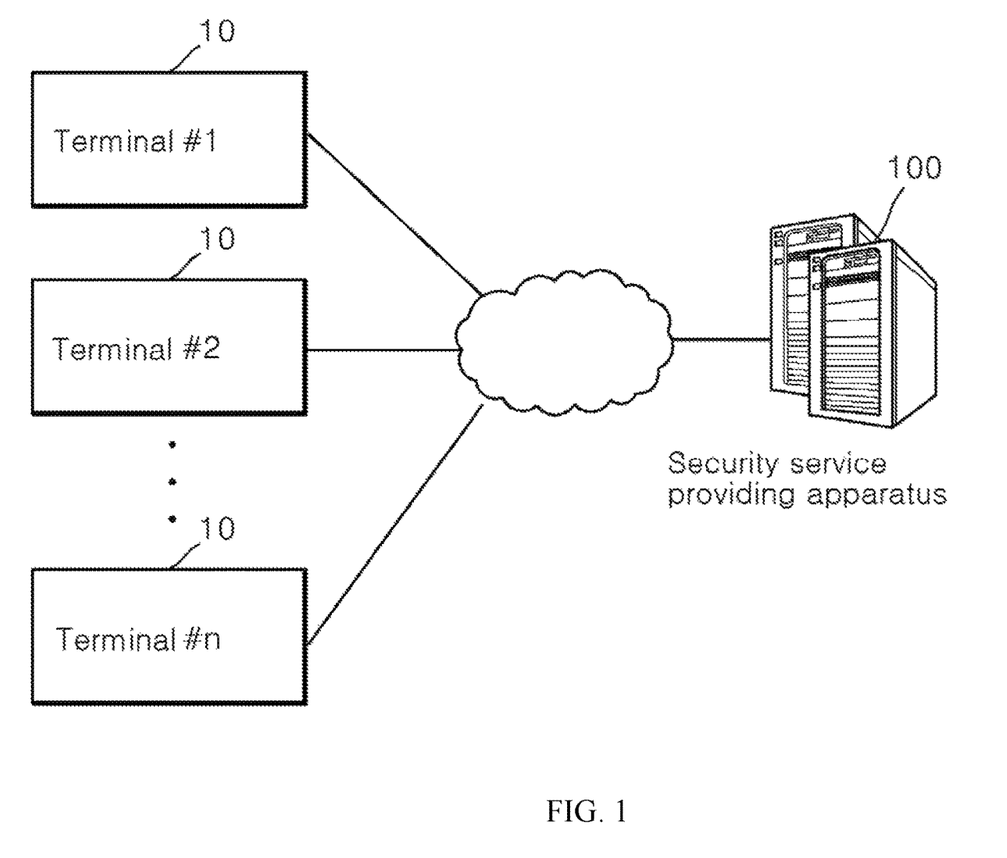
FIG. 1 is a configuration view of a security service providing system configured with a security service providing apparatus for supporting a lightweight security scheme according to an embodiment of the present invention.
Figure 2:
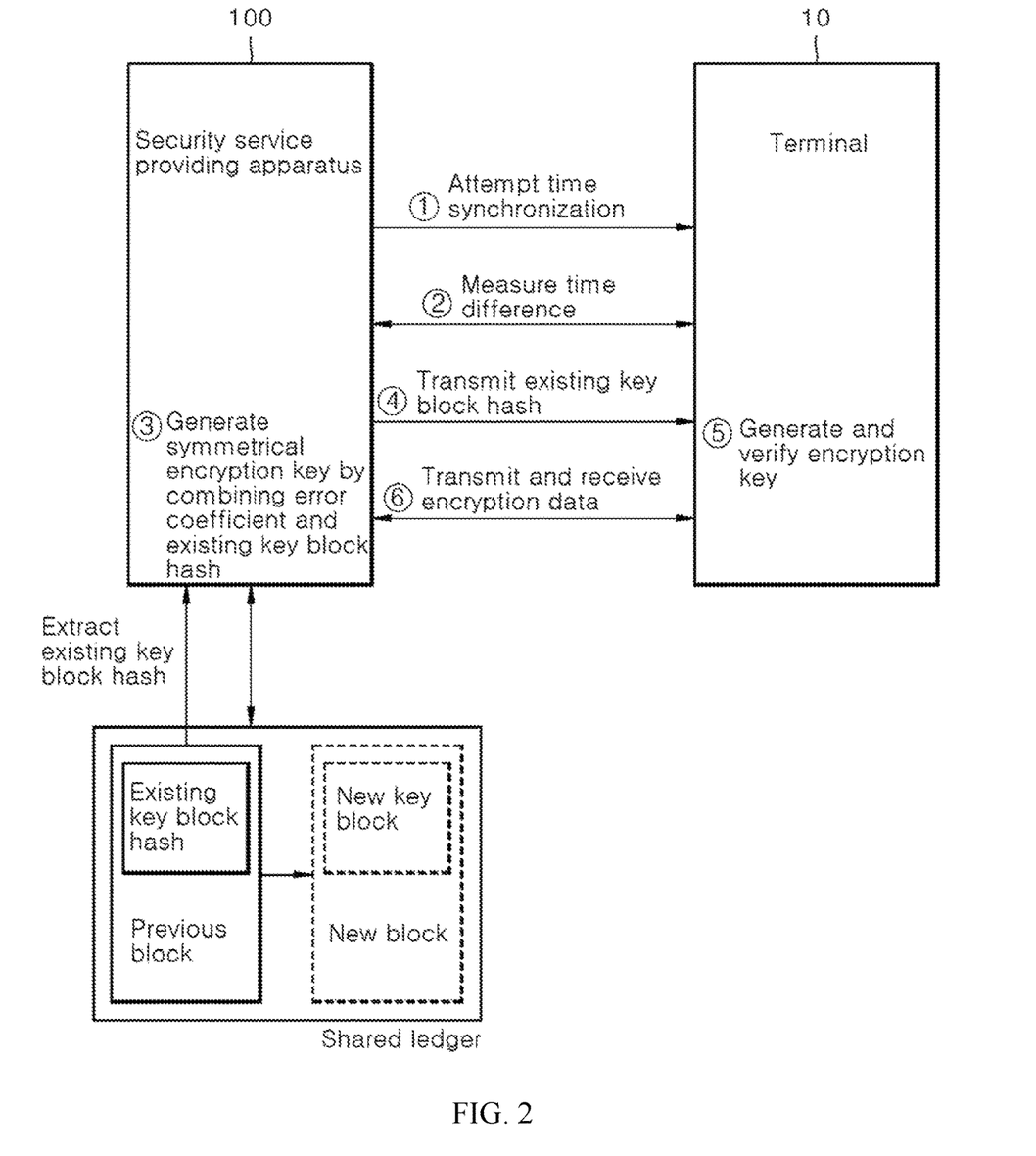
FIG. 2 is an exemplary view of an operation for a security service providing method of a security service providing apparatus for supporting a lightweight security scheme according to an embodiment of the present invention.
Figure 3:
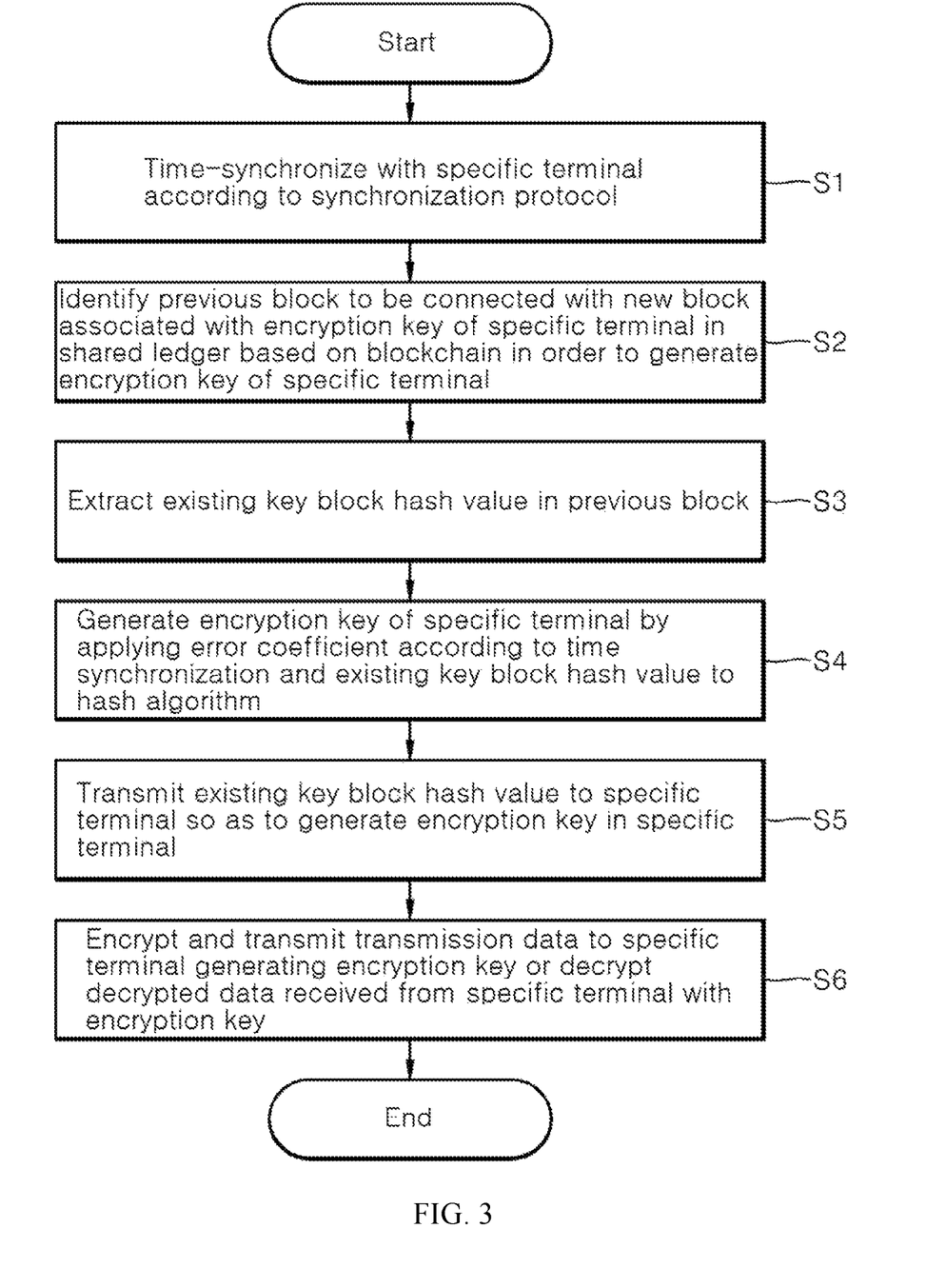
FIG. 3 is a flowchart for a security service providing method for supporting a lightweight security scheme according to an embodiment of the present invention.

FIG. 1 is a configuration view of a security service providing system configured with a security service providing apparatus 100 for supporting a lightweight security scheme according to an embodiment of the present invention, and FIGS. 2 and 3 are an operational exemplary view and a flowchart for a security service providing method for supporting a lightweight security scheme of the security service providing apparatus 100 (hereinafter, referred to as a service providing apparatus), respectively.

A detailed operational configuration of the present invention will be described with reference to FIGS. 1 to 3.

As illustrated in FIGS. 1 to 3, the service providing apparatus 100 may be connected with one or more terminals 10 via a communication network and pre-store a shared ledger based on a blockchain.

At this time, the communication network may be applied with various wired/wireless communication schemes which are widely known. Examples of the wireless communication networks may include a wireless LAN (WLAN), a digital living network alliance (DLNA), a wireless broadband (Wibro), a world interoperability for microwave access (Wimax), GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), IEEE 802.16, Long Term Evolution (LTE), LTE-A (Long Term Evolution-Advanced), a Wireless Mobile Broadband Service (WMBS), a 5G mobile communication service, Bluetooth, LoRa (Long Range), RFID (Radio Frequency Identification), Infrared Data Association (IrDA), UWB (Ultra Wideband), ZigBee, Near Field Communication (NFC), Ultra Sound Communication (USC), Visible Light Communication (VLC), Wi-Fi, Wi-Fi Direct, etc. Further, examples of the wired communication network may include a wired local area network (LAN), wired wide area network (WAN), power line communication (PLC), USB communication, Ethernet, serial communication, optical/coaxial cables, etc.

Further, the service providing apparatus 100 may be configured as a server, and the terminal may be configured with various terminals such as a camera, a sensor, VMS (Video Management System), DVR (Digital Video Recorder), NVR (Network Video Recorder), IoT (Internet of Things) terminal, etc.

At this time, the camera may be configured as an internet protocol (IP) camera.

Further, the terminal 10 may be configured as a terminating device.

Meanwhile, the service providing apparatus 100 supports a lightweight security scheme while securing security for a communication session when communicating with the terminal 10 and supports a security communication session with the terminal to be easily formed even when the terminal 10 is configured as a low-performance device and secures security of an encryption key used in the communication session with the terminal 10 to secure reliability for the security when communicating with the terminal 10. This will be described in detail.

First, the service providing apparatus 100 may perform time synchronization for each of one or more terminals 10 according to a predetermined synchronization protocol.

At this time, the synchronization protocol may be a network time protocol (NTP).

Accordingly, the service providing apparatus 100 may perform time synchronization for each of one or more terminals 10 according to the synchronization protocol and then measure a time difference for each terminal 10 and to store the time difference (S1).

At this time, a specific terminal 10 which performs time synchronization with the service providing apparatus 100 according to the synchronization protocol may calculate and store the same time difference as the time difference for the specific terminal 10 measured by the service providing apparatus 100.

Through this, the service providing apparatus and the specific terminal 10 may share the same time difference as each other.

Meanwhile, the service providing apparatus 100 may identify a previous block which is to be connected with a new block associated with an encryption key of the specific terminal 10 in a predetermined shared ledger to be used for the blockchain in order to generate the encryption key of the specific terminal 10 (S2).

At this time, the new block may be a block which includes at least one transaction for a generation process of an encryption key of the specific terminal 10 or is generated based on a transaction related to the generation process of the encryption key of the specific terminal 10.

Further, the previous block may be a block which includes at least one transaction for a generation process of an encryption key (the other encryption key) of the other terminal different from the specific terminal 10 or is generated based on a transaction related to the generation process of the encryption key (the other encryption key) of the other terminal.

That is, the blocks stored in the shared ledger may include a transaction for the generation process of the encryption key of the terminal communicating with the service providing apparatus 100 or information related to the corresponding transaction.

Further, the service providing apparatus 100 may extract an existing key block hash value obtained by applying a hash value used for generating the other encryption key related to the other terminal, information related to the other encryption key including identification information of the other terminal and the other encryption key related to the other terminal, and a generation time of the existing key block to a predetermined hash algorithm in an existing key block which is included in the previous block stored in the shared ledger and stores the information related to the other encryption key of the other terminal (S3).

At this time, the information related to the other encryption key may include a hash value used for the generation of the other encryption key related to the other terminal, identification information of the other terminal, and the other encryption key related to the other terminal, and the generation time of the existing key block may be also included in the information related to the other encryption key. Further, the existing key block hash value may be stored (included) in the existing key block.

Further, the other encryption key is a symmetric encryption key shared with the service providing apparatus 100 and the other terminal for data security with the other terminal and may be an encryption key generated for the other terminal according to the same scheme as the generation process of the encryption key of the specific terminal 10.

Further, the hash value used for the generation of the other encryption key may be a key block hash key of a previous key block connected with the existing key block in the shared ledger. The previous key block may be a key block which includes the information related to the other encryption key as a key block which is generated in the generation process of the encryption key related to the specific terminal and the other encryption key other than the other encryption key related to the other terminal and stored in the shared ledger. Further, the previous key block may be a key block for the other encryption key generated immediately before the generation of the other encryption key.

Further, the service providing apparatus 100 may calculate a random number value by applying an error coefficient according to the time difference with the specific terminal 10 measured through the time synchronization and the existing key block hash value to a predetermined hash algorithm and generate the corresponding random number value as an encryption key for the specific terminal 10 (S4).

At this time, the hash algorithm described in the present invention may be secure hash algorithm 1 (SHA-1).

Further, the service providing apparatus 100 may generate an encryption key for the specific terminal 10 by applying the error coefficient to a predetermined hash algorithm when the previous block is not identified.

For example, the service providing apparatus 100 may identify the previous block in the shared ledger while being most recently generated and stored in the shared ledger before the generation of the new block which is related to the generation of the encryption key of the specific terminal 10 to be generated.

Further, the service providing apparatus 100 extracts the existing key block hash value predetermined in the existing key block in the shared ledger so as to determine forgery of the information included in the existing key block by applying the information included in the existing key block to the hash algorithm in an existing key block included in the previous block and including information related to the other encryption key included in the generated in the other terminal. In addition, the service providing apparatus 100 may generate a random number value as an encryption key for the specific terminal 10, wherein the random number value is a hash value generated by applying the time difference-related error coefficient pre-stored for the specific terminal 10 and the existing key block hash value to the predetermined hash algorithm.

At this time, the service providing apparatus 100 may generate a separate key block for an encryption key when the encryption key is generated for a generation period of a specific block configuring the blockchain to include the generated key block in the specific block. The key block may include a generation time of the key block, a key block hash value of the other key block which is used for generating a terminal-related encryption key and is to be connected with the key block, identification information of the terminal, and a terminal-related encryption key as the encryption key-related information.

Here, the key block hash value used for the generation of the terminal-related encryption key may be stored (included) or set in the other key block as a value obtained by hashing the information stored (included) in the other key block through the hash algorithm.

Further, the generation time of the key block included in the key block may be replaced with a time difference-related error coefficient for a terminal according to time synchronization between the terminal and the service providing apparatus 100.

For example, in the existing key block, a time difference-related error coefficient calculated according to time synchronization between the other terminal corresponding to the existing key block and the service providing apparatus 100 may be included (stored) instead of the generation time of the existing key block. In order to calculate an existing key block hash value of the existing key block, the error coefficient related to the other terminal is applied to the hash algorithm instead of the generation time of the existing key block to calculate the existing key block hash value.

For example, in the new key block to be described below, a time difference-related error coefficient calculated according to time synchronization between a specific terminal 10 corresponding to the new key block and the service providing apparatus 100 may be included instead of the generation time of the new key block. In order to calculate a new key block hash value of the new key block, the error coefficient related to the specific terminal 10 is applied to the hash algorithm instead of the generation time of the new key block to calculate the new key block hash value.

Further, the service providing apparatus 100 may calculate a key block hash value which is a block hash value for a key block by applying information on the encryption key included in the key block to a hash algorithm like connecting different blocks to each other using the block hash value to include the calculated key block hash value in the key block. The other key block generated for the other terminal and the key block may be connected to each other like a chain in the shared ledger using the corresponding key block hash value for the generation of the encryption key of the other terminal.

That is, the service providing apparatus 100 may connect different key blocks to each other like a chain through the key block hash value separately from the chain connection of the blocks.

As a result, when the information included in the key block is forged, the key block hash value in the key block is changed, and thus, the service providing apparatus 100 may easily trace the forgery of the information in the key block through the change of the key block hash value and trace the forgery through the key block separately only for the encryption key by distinguishing the information from the information stored in the block other than the key block.

Meanwhile, the service providing apparatus 100 may transmit an existing key block hash value extracted from the existing key block included in the previous block to the specific terminal 10 to generate the same encryption key as the service providing apparatus 100 in the specific terminal 10 (S5).

At this time, the service providing apparatus 100 may generate the encryption key for each of the one or more terminals through the aforementioned configuration and generate different encryption keys from each other between the one or more terminals.

Further, the specific terminal 10 receiving the existing key block hash value from the service providing apparatus 100 may generate the encryption key by applying the existing key block hash value and the time difference-related error coefficient measured in the process of performing synchronization with the service providing apparatus 100 to a predetermined hash algorithm which is the same hash algorithm set in the service providing apparatus 100.

That is, the specific terminal 10 may generate the same encryption key as the encryption key corresponding to the specific terminal 10 and generated in the service providing apparatus 100 and the encryption keys generated in the service providing apparatus 100 and the specific terminal 10 may be configured as a symmetrical encryption key.

In the aforementioned configuration, when a plurality of service providing apparatuses 100 are operated in response to a plurality of different sites (e.g., a service providing apparatus of company A and a service providing apparatus of company B), a unique set value (or a magic number) different from the other service providing apparatuses 100 may be preset in the service providing apparatuses 100 as a weight element for distinguishing the plurality of sites and weighing a change in the encryption key.

Further, the service providing apparatuses 100 may share the unique set value with terminals communicating with the service providing apparatuses 100.

Further, the service providing apparatuses 100 may generate a first random number value by applying the error coefficient related to the specific terminal 10 and the existing key block hash value to the hash algorithm and then calculate a second random number value by applying the first random number value and the unique set value to the hash algorithm again, and generate the second random number value as an encryption key of the specific terminal 10.

Further, the specific terminal 10 may also pre-store a unique set value of the service providing apparatuses 100, generate a first random number value based on the existing key block hash value and the error coefficient received from the service providing apparatuses 100, and then generate a second random number value calculated by applying the first random number value and the unique set value to the hash algorithm again as an encryption key.

Thus, the same second random number value used as the encryption key between the service providing apparatus 100 and the specific terminal 10 may be calculated.

Meanwhile, the service providing apparatus 100 may encrypt an encryption key generated in response to the specific terminal 10 to transmit the encryption key to the specific terminal 10. The specific terminal 10 decrypts the encryption key received from the service providing apparatus 100 and then compares the decrypted encryption key with the encryption key generated in the specific terminal 10 to determine whether the encryption key received from the service providing apparatus 100 and the encryption key generated in the specific terminal 10 are the same as each other.

Further, the specific terminal 10 may verify the encryption key generated in the specific terminal 10 according to whether the encryption keys are the same as each other and use the encryption key generated in the specific terminal 10 as an encryption key for encrypting and decrypting data in data transmission and reception with the service providing apparatus 100 when the verification is completed.

For example, the service providing apparatus 100 may encrypt an encryption key generated in response to the specific terminal 10 as the corresponding encryption key to transmit the encryption key to the specific terminal 10. The specific terminal 10 decrypts the encrypted encryption key received from the service providing apparatus 100 as the encryption key generated in the specific terminal 10 and then compares the decrypted encryption key with the encryption key generated in the specific terminal 10 to determine that the verification is completed when the encryption keys are the same as each other.

Further, the specific terminal 10 may transmit completion information on the verification completion when the verification is completed to the service providing apparatus 100 and the service providing apparatus 100 may use the encryption key generated in response to the specific terminal 10 when the completion information is received as an encryption key for period encryption of the communication session.

Accordingly, the service providing apparatus 100 may encrypt and transmit transmission data transmitted to the specific terminal 10 as the encryption key generated in response to the specific terminal 10, and the specific terminal 10 may decrypt the transmission data encrypted as the encryption key from the service providing apparatus 100 as the encryption key generated in the specific terminal 10 (S6).

Further, the specific terminal 10 may also encrypt and transmit data to be transmitted to the service providing apparatus 100 as the same encryption key as the encryption key generated in response to the specific terminal 10 by the service providing apparatus 100. The service providing apparatus 100 may decrypt reception data encrypted as the encryption key received from the specific terminal 10 as the encryption key generated in response to the specific terminal 10.

At this time, the service providing apparatus 100 and the specific terminal 10 may encrypt or decrypt the data as the encryption key using a lightweight encryption algorithm (LEA) and the LEA may be based on 128 bits.

Further, the service providing apparatus and the specific terminal may encrypt and decrypt the data as the encryption key by selectively using various symmetrical encryption algorithms, such as advanced encryption standard (AES)-256 and ARIA as well as the LEA.

Further, the identification information (or terminal identification information) of the terminal described in the present invention may include an IP, a MAC address, a serial number, etc.

As described above, in the present invention, for security for the communication session between the service providing apparatus and the terminal, the encryption key of the terminal is generated as the hash through the hash algorithm by combining the time difference generated in the time synchronization process with the terminal and the hash generated based on the information related to the encryption key of the other terminal stored in the blockchain to generate a symmetrical encryption key which cannot be inferred and has high security. As a result, the present invention supports so that the data transmitted and received through the communication session is encrypted to provide a lightweight security scheme using a symmetrical encryption key configured as a hash and having high security, thereby safely securing the security for the communication session with the terminal and to lower a processing load of the terminal in relation to the security, thereby securing high security and reliability in relation to the transmission and reception data which are easily applicable even when the terminal is configured as a low-performance device.

Meanwhile, the service providing apparatus 100 may prevent the forgery for the encryption key through the blockchain and enhance the security by using the key block hash (key block hash value) of the existing key block included in the previous block generated immediately before a new block generated in relation to the encryption key when the encryption key is generated and to be connected with the new block for the generation of the encryption key. This will be described in detail with reference to FIG. 4.

Figure 4:
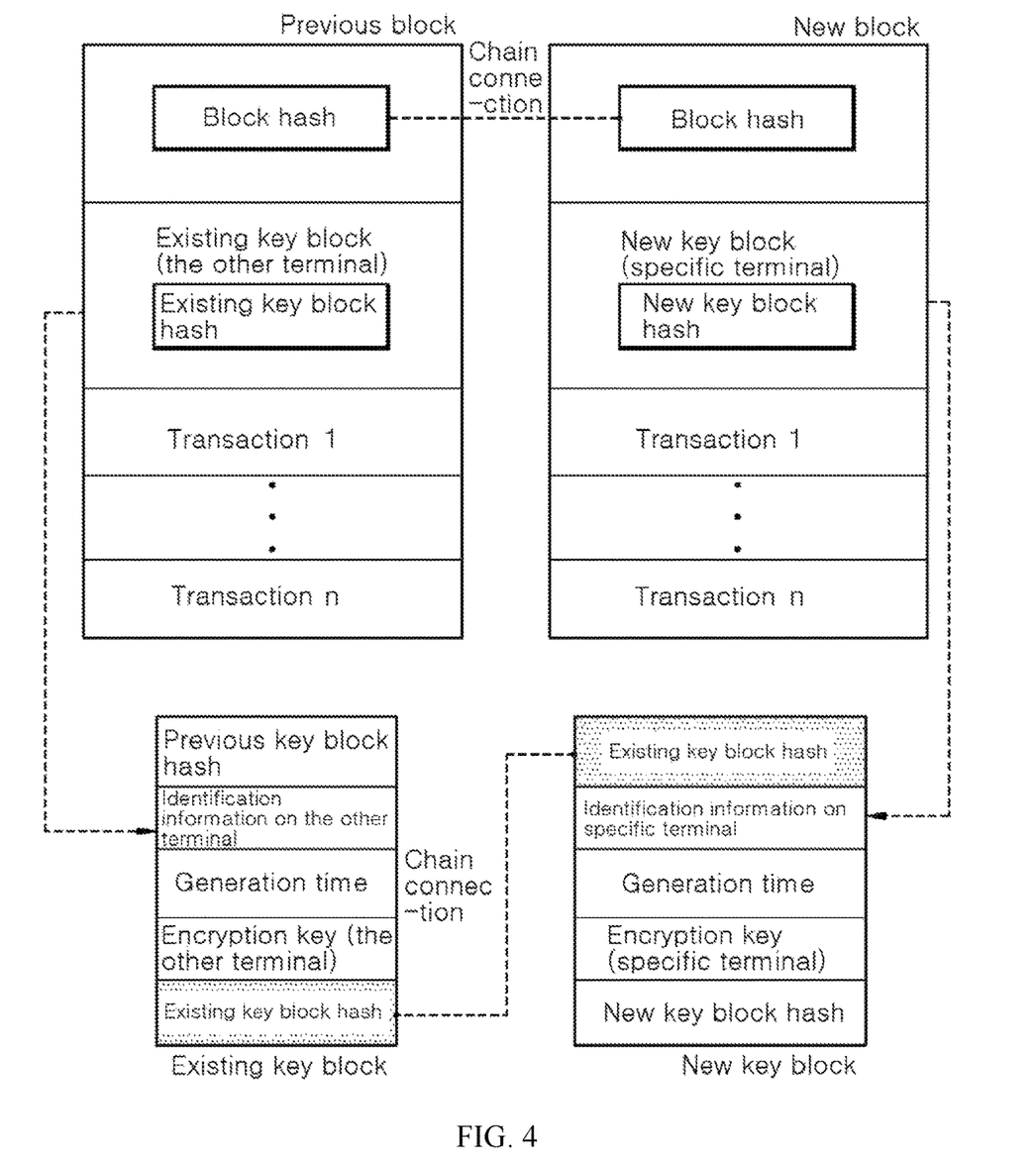
FIG. 4 is an exemplary view for management of a blockchain of a security service providing apparatus for supporting a lightweight security scheme according to an embodiment of the present invention.

First, the blockchain described in the present invention is an algorithm which configures information on a plurality of transactions as a block and manages security information by connecting many blocks like a chain using a hash.

In addition, the transaction described in the present invention may mean transaction information, and the transaction information may include one or more operation functions and data required for performing a unit operation or a unit transaction.

According to the aforementioned configuration, the service providing apparatus 100 may generate one or more transactions associated with the encryption key of the specific terminal 10.

For example, the service providing apparatus 100 may generate a first transaction including an error coefficient related to the time difference generated when performing the time synchronization of the specific terminal 10 and data and commands transmitted and received to and from the specific terminal 10 for performing the time synchronization.

Further, a shared ledger for the blockchain is pre-stored in the service providing apparatus 100, and the service providing apparatus 100 may generate a second transaction including an existing key block hash value, an error coefficient, and a random number value for setting the random number value obtained by applying the existing key block hash value included in a previous block to be connected with a new block associated with the generation of the encryption key corresponding to the specific terminal 10 and the error coefficient to a predetermined hash algorithm, and commands for setting the random number value as the encryption key.

As such, the service providing apparatus 100 may generate the first and second transactions associated with the generation of the encryption key of the specific terminal 10.

Further, the service providing apparatus 100 may generate transactions in association with data (e.g., image data) transmitted and received to and from another terminal other than the specific terminal 10 for a generation period of the new block generated in relation to the encryption key of the specific terminal 10, and the transaction generated according to the data transmission and reception with another terminal may be included in the new block.

Further, the service providing apparatus 100 may generate a plurality of hash values corresponding to a plurality of transactions by applying the plurality of transactions including the first and second transactions generated for the generation period of the new block to the predetermined hash algorithm and a root hash value corresponding to the new block by applying the plurality of hash values according to a generation order for each transaction to the hash algorithm according to a predetermined binary tree (or merkle tree) structure.

That is, the service providing apparatus 100 may generate a root hash value for determining the forgery of the new block based on one or more transactions generated in relation to the encryption key of the specific terminal 10 for the generation period of the new block and a hash value for each of the one or more transactions generated in relation to data transmitted and received through communication with one or more other terminals.

Further, the service providing apparatus 100 may generate a block hash value for connecting the new block with the previous block based on the block hash value of the previous block and the root hash value to include the block hash value in the new block and then register and store the new block in the shared ledger so as to be connected to the previous block.

As a result, when one root hash necessarily exists in one block and any of the information included in the block is forged, the corresponding hash value and all hash values above the hash value are changed, and as a result, the root hash value is varied, and thus when comparing only the root hash value of the block, even if hashes below the hash value are not compared and checked one by one, it may be immediately confirmed whether the data is forged.

Further, the service providing apparatus 100 may generate a block hash value of the new block by combining a generation date, a version, bits, and a root hash value of the new block, a block hash value of the previous block, and a provisional value called a nonce and then converting the values into a hash and generate a new block including the block hash value of the new block and then store the generated new block in the shared ledger by connecting the new block to the previous block generated immediately before the generation of the new block like a chain.

In the aforementioned configuration, in the service providing apparatus 100, only the hash value obtained by applying each of the plurality of transactions corresponding to the new block to a predetermined hash algorithm may be included in the new block and the transaction-related transaction information may be stored in a DB included in the service providing apparatus 100.

For example, the service providing apparatus 100 may store the corresponding image data when receiving the image data from a terminal constituted by a camera in the DB and include a hash value obtained by applying the transaction generated in relation to the image data to the hash algorithm in the new block.

Meanwhile, through the blockchain configuration described above, the service providing apparatus 100 may confirm the forgery of the transaction, but even when the forgery of the encryption key occurs, a hash value corresponding to the transaction is changed by binding to one operation called a transaction, and thus there is a problem in that it is difficult to confirm whether the forgery in the encryption key itself occurs or the forgery for the generation process of the encryption key occurs.

To solve this, the service providing apparatus 100 may generate a separate key block to include the key block in the new block.

When describing this in detail, the service providing apparatus 100 may generate a new block connected to the previous block based on one or more transactions generated in relation to the encryption key of the specific terminal 10.

Further, the service providing apparatus 100 may extract an existing key block hash value which is an existing key block-related hash value to be used for the generation of the encryption key of the specific terminal 10 from the existing key block corresponding to the encryption key (the other encryption key) of the other terminal included in the previous block which is to be connected with the new block in the shared ledger for the generation period of the new block generated in relation to the generation of the encryption key of the specific terminal 10.

At this time, the existing key block corresponding to the other terminal may include a hash value (key block hash value) included another key block used for generating the other encryption key of the other terminal, terminal identification information of the other terminal, a generation time (or generation date) of the existing key block, the other encryption key corresponding to the other terminal, and an existing key block hash value related to the existing key block.

Further, the existing key block hash value may be obtained by applying the hash value included another key block used for generating the other encryption key of the other terminal, the information related to the other encryption key including the terminal identification information of the other terminal and the other encryption key corresponding to the other terminal, and the generation time of the existing key block to the hash algorithm.

At this time, the generation time of the existing key block may also be information included in the information related to the other encryption key, which is not constituted separately from the information related to the other encryption key.

Further, the generation time of the existing key block included in the existing key block may be replaced with a time difference-related error coefficient measured according to the synchronization protocol between the other terminal and the service providing apparatus 100.

Accordingly, the service providing apparatus 100 may extract an existing key block hash value related to the existing key block from the existing key block and then generate a random number value as the encryption key for the specific terminal 10, wherein the random number value is a hash value calculated by applying the existing key block hash value related to the existing key block and an error coefficient obtained through the time synchronization process according to the synchronization protocol with the specific terminal 10 to a predetermined has algorithm.

Further, the service providing apparatus 100 may generate a new key block including the existing key block hash value used for generating the encryption key for the specific terminal 10 when generating the encryption key corresponding to the specific terminal 10, a generation time (or generation date) of a new key block in which the encryption key-related information including the identification information of the specific terminal 10 and the encryption key related to the specific terminal 10 is included (stored), and the encryption key-related information, and generate a new key block hash value related to the new key block corresponding to the specific terminal 10 by applying the generation time (or generation date) of the new key block stored (included) in the new key block and the encryption key-related information to the hash algorithm.

Further, the service providing apparatus 100 may include the new key block hash value in the new key block or set the new key block hash value as the key block hash value of the new key block.

Accordingly, the service providing apparatus 100 may generate a new key block including the encryption key corresponding to the specific terminal 10, the existing key block hash value, the terminal identification information of the specific terminal 10, the generation time (or generation date) of the new key block stored (included) in the new key block, and the new key block hash value, and may include the new key block in the new block and then store the new key block in the shared ledger together with the new block when the new block is stored in the shared ledger.

At this time, the service providing apparatus 100 may also generate the new key block hash value by applying the time difference-related error coefficient obtained through the time synchronization with the specific terminal 10 to the hash algorithm instead of the generation time of the new key block when the new key block hash value is generated (calculated) and also generate a new key block including the time difference-related error coefficient of the specific terminal 10 instead of the generation time of the new key block.

Further, the generation time of the new key block may also be information included in the information related to the encryption key, which is not constituted separately from the information related to the encryption key.

Through the aforementioned configuration, the service providing apparatus 100 may generate a new key block in relation to the encryption key of the specific terminal 10 for a generation period of the new block and generate a key block hash value for determining the forgery of the new key block related to the specific terminal 10 based on the information related to the encryption key of the specific terminal 10 to include the generated key block hash value in the new key block and then include the new key block in the new block as a separate block in the new block and then store the new key block in the shared ledger.

At this time, the service providing apparatus 100 includes the existing key block hash value of the existing key block used for generating the encryption key of the specific terminal 10 in the new key block to be used for generating the new key block hash value for confirming the forgery of the new key block and thus may connect the new key block included in the new block and the existing key block included in the previous block to each other like a chain through the existing key block hash value and the new key block hash value when the new key block generated in relation to the encryption key of the specific terminal 10 is included in the new block and stored in the shared ledger.

That is, the service providing apparatus 100 may generate a separate key block for each encryption key generated for each terminal and then connect the key blocks to each other like a chain in the shared ledger in addition to connecting the blocks related to the transactions to each other like a chain in the shared ledger.

Therefore, the service providing apparatus 100 may easily detect the forgery of the specific key block by tracing one or more key blocks with changed hash values because the key block hash value is changed every key block connected after the specific key block as well as the key block hash value for determining the forgery of the specific key block when the encryption key-related information including the encryption key included in the specific key block is forged.

That is, the present invention uses the blockchain to confirm the forgery of the encryption key, but supports the forgery to be easily detected when the forgery for the encryption key-related information as well as the encryption key occurs by generating a separate key block for confirming the forgery of the encryption key-related information distinguished from the block using the information used in the generation process of the encryption key and the identification information and the encryption key of the terminal corresponding to the encryption key even in addition to the block generated based on the transaction generated in the generation process of the encryption key, thereby enhancing the security for the encryption key used for the encryption of the communication session.

Meanwhile, in the aforementioned configuration, the service providing apparatus 100 may generate and store the encryption key for the specific terminal 10 and then delete and discard the pre-stored encryption key when a change of the encryption key is required.

Further, the service providing apparatus 100 may transmit update request information for changing (or updating) the encryption key to the specific terminal 10 and the specific terminal 10 may delete and discard the encryption key pre-generated and stored when receiving the update request information.

Further, the service providing apparatus 100 may add discard information related to the encryption key to be discarded in a specific key block generated when the encryption key is discarded to the specific key block and register and store the specific key block including the discard information in the shared ledger.

At this time, the service providing apparatus 100 may calculate a key block hash value of the specific key block by applying the discard information to the hash algorithm together with a key block hash value for the key block before the specific key block included in the specific key block, identification information for each of one or more terminals corresponding to the specific key block, one or more different new encryption keys corresponding to the specific key block, and a generation time of the specific key block when calculating the key block hash value of the specific key block storing (including) the discard information and include or set a key block hash value reflected with the discard information in the specific key block.

Further, the service providing apparatus 100 uses the key block hash value of the specific key block reflected with the discard information when generating an encryption key corresponding to a next key block generated after the specific key block and uses the key block hash value of the specific key block when calculating a key block hash value of the next key block to also determine the forgery for the discard information stored in the shared ledger, thereby enhancing the security by preventing the discarded encryption key from being used.

Further, the service providing apparatus 100 may measure a time difference through the time synchronization for the specific terminal 10 in the encryption key is discarded and then generate and store a new encryption key for the specific terminal 10 using the generation process of the encryption key described above, and generate a key block corresponding to the new encryption key and store the key block in the shared ledger.

Figure 5:
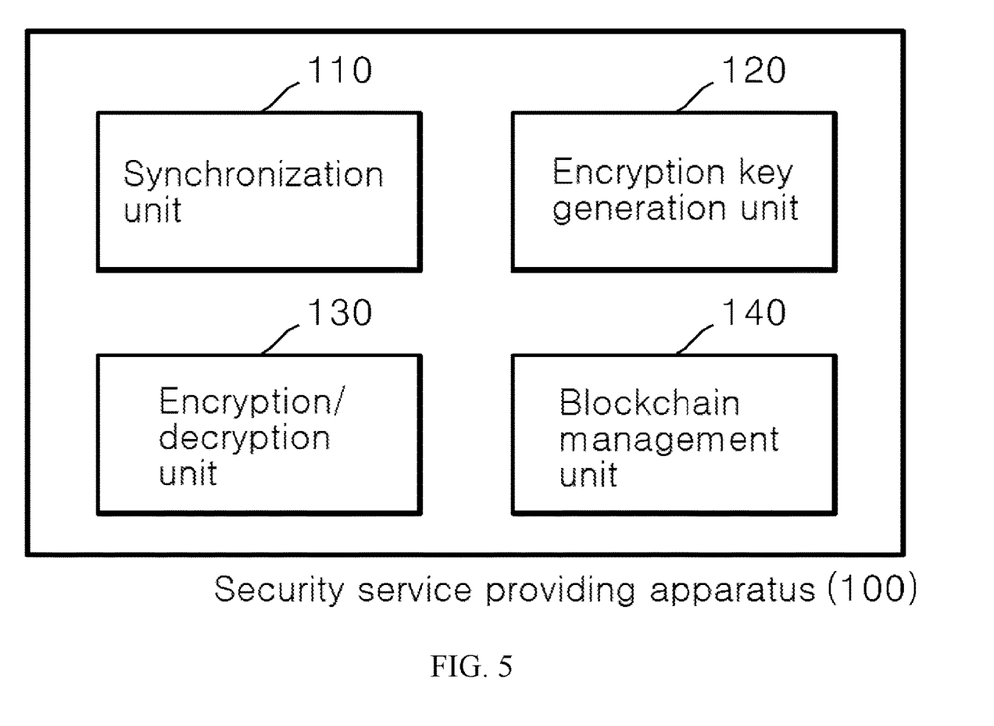
FIG. 5 is a detailed configuration view of a security service providing apparatus for supporting a lightweight security scheme according to an embodiment of the present invention.

FIG. 5 is a detailed configuration view of the service providing apparatus 100 according to the aforementioned configuration.

As illustrated in FIG. 5, the service providing apparatus 100 may be configured by including a synchronization unit 110, an encryption key generation unit 120, an encryption/decryption unit 130, and a blockchain management unit 140.

The synchronization unit 110 may perform time synchronization with the specific terminal 10 according to a predetermined synchronization protocol.

Further, the encryption key generation unit 120 may identify a previous block to be connected with a new block associated with an encryption key of the specific terminal 10 in a pre-stored shared ledger sued in the blockchain in order to generate the encryption key of the specific terminal 10, extract an existing key block hash value obtained by applying the hash value used for generating the other encryption key related to the other terminal, the information related to the other encryption key including the identification information of the other terminal and the other encryption key related to the other terminal, and the generation time of the existing key block to a predetermined hash algorithm in the existing key block which is included in the previous block and stores the information related to the other encryption key of the other terminal, and generate an encryption key for the specific terminal 10 by applying an error coefficient according to a time difference from the specific terminal 10 measured through the time synchronization and the existing key block hash value to the predetermined hash value algorithm.

Further, the encryption key generation unit 120 may transmit the hash value to the specific terminal 10 to generate the encryption key in the specific terminal 10.

Meanwhile, the encryption/decryption unit 130 may encrypt transmission data with the encryption key to transmit the encrypted transmission data to the specific terminal 10 generating the encryption key or decrypt reception data encrypted with the encryption key received from the specific terminal 10 with the encryption key.

Further, the blockchain management unit 140 may manage the aforementioned blockchain, pre-set the shared ledger, and generate the new block and the key block in relation to the encryption key of the specific terminal 10 by interlocking with the encryption key generation unit 120, and then store the generated blocks in the shared ledger.

For example, the blockchain management unit 140 may generate a new block connected to the previous block based on one or more transactions generated in relation to the encryption key of the specific terminal 10, generate the new key block including a new key block hash value obtained by applying the existing key block hash value used for generating he encryption key for the specific terminal 10 when generating the new block or generating the encryption key of the specific terminal 10, the generation time of the new key block in which the encryption key-related information including the identification information of the specific terminal 10 and the encryption key related to the specific terminal 10 is included (stored), and the encryption key-related information to the hash algorithm to include the generated new key block in the new block, and then register the new block in the shared ledger so that the existing key block corresponding to the existing key block hash value included in the previous block and the new key block are connected to each other.

At this time, the synchronization unit 110, the encryption key generation unit 120, the encryption/decryption unit 130, and the blockchain management unit 140 may be configured to be included in one control unit, and the corresponding control unit may be configured to perform an overall control function of the service providing apparatus 100.

The control unit may include a RAM, a ROM, a CPU, a GPU, and a bus, and the RAM, the ROM, the CPU, and the GPU may be connected to each other via a bus. The CPU accesses a storage unit and may perform booting using an operating system (O/S) pre-stored in the storage unit and perform various operations of the service providing apparatus 100 described in the present invention using various programs, contents, and data pre-stored in the storage unit.

FIGS. 6 to 9 are exemplary views of algorithms related to a security service providing method for supporting a lightweight security scheme set in the service providing apparatus 100 and the specific terminal 10 according to an embodiment of the present invention.

Figure 6:
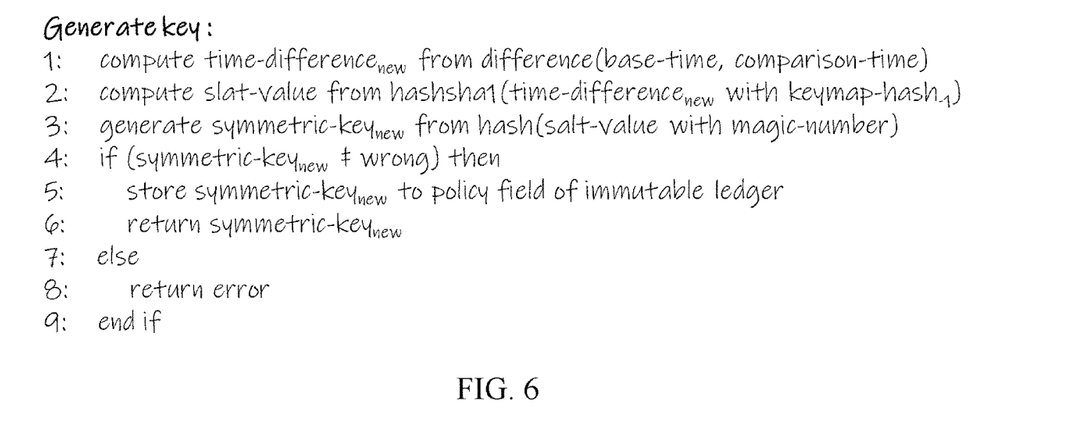
FIGS. 6 to 9 are exemplary views of algorithms relating to a security service providing method for supporting a lightweight security scheme according to an embodiment of the present invention.

First, as illustrated in FIG. 6, the service providing apparatus 100 may calculate a time difference time-difference$_{new}$ between a reference time and a comparison time when attempting the time synchronization in response to the specific terminal 10.

Further, the service providing apparatus 100 may extract a key block hash value of the existing key block which is included in the previous block to be connected with the new block for generating the encryption key of the specific terminal 10 and related to the encryption key of the other terminal from the pre-stored shared ledger and calculate a first random number hash value (salt-value, 40 bytes) by combining the corresponding existing key block hash value and the time difference time-difference$_{new}$ and hashing the combined value using a predetermined hash algorithm.

Next, the service providing apparatus 100 may generate a unique symmetrical encryption key which is a second random number hash value (symmetric-key$_{new}$, 40 bytes) by combining the first random number hash value and a pre-determined set value (magic-number) and applying and hashing the combined value to the hash algorithm.

Further, the service providing apparatus 100 may generate a new block corresponding to the encryption key, generate a new key block related to the encryption key generated in response to the specific terminal 10, and then store the generated new key block included in the key block in the shared ledger.

Through this, the service providing apparatus 100 may generate a block hash value of the new block based on the block hash value of the previous block to connect and store the new block and the previous block like a chain, and simultaneously generate a key block hash value of the new key block using the key block hash value of the existing key block included in the previous block, and then connect and store the new key block and the existing key block like a chain, thereby securing the security for the encryption key.

Figure 7:
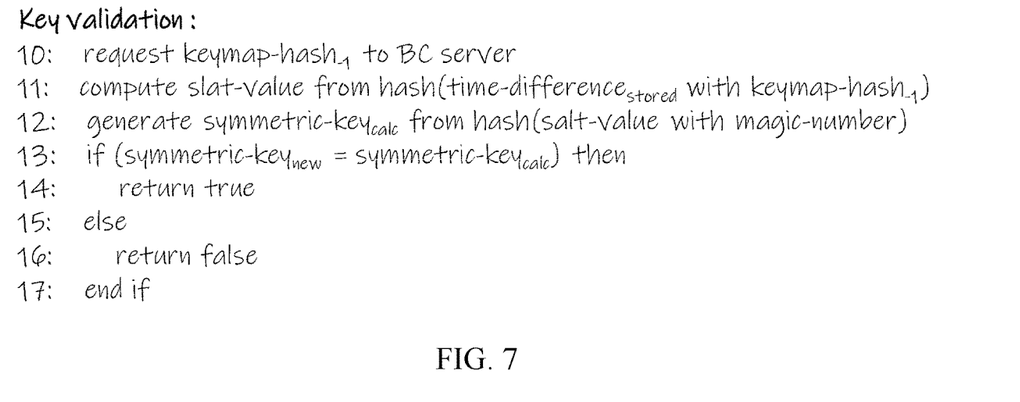

Further, as illustrated in FIG. 7, since the encryption key generated in response to the specific terminal 10 is constituted by a symmetrical key, it is necessary to use accurately the same key between the service providing apparatus 100 and the specific terminal 10.

Therefore, it is necessary to verify whether a key newly generated in the service providing apparatus 100 to be shared from the service providing apparatus 100 is a key generated with the same mechanism even at the specific terminal 10 side again.

At this time, among elements required for calculating the first random number hash value (first random number value), since the existing key block hash value may be determined by only the service providing apparatus 100, the specific terminal 10 may request and receive the existing key block hash value to the service providing apparatus (BC server) 100, perform a generation process of the same encryption key as the service providing apparatus 100 by combining a time difference time-difference$_{stored}$ pre-known by the specific terminal 10 and an existing key block hash value keymap-hash$_{-1}$ received from the service providing apparatus 100, and finally compare and verify whether the two hashed encryption key values symmetric-key$_{new}$ and symmetric-key$_{calc}$ are the same as each other.

If the service providing apparatus 100 and the specific terminal 10 are not included in the same system, the service providing apparatus 100 and the specific terminal 10 have different set values, and at this time, the two encryption key values do not always coincide with each other.

Figure 8:
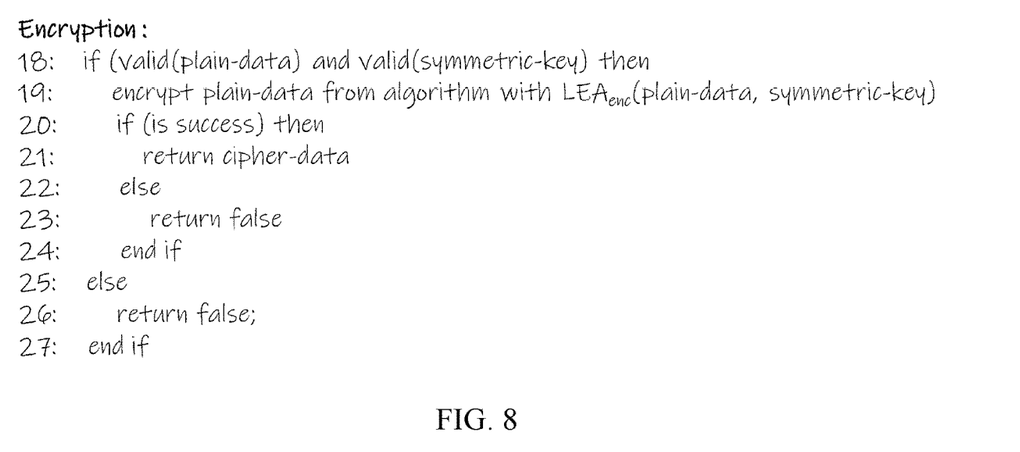

Further, as illustrated in FIG. 8, the service providing apparatus 100 may encrypt data to be transmitted/received using a shared encryption key generated through the aforementioned process.

Since various low-performance devices are connected to the service providing apparatus 100, the service providing apparatus 100 uses a LEA 128 bit block encryption algorithm which has a strong aspect in performance and security among lightweight encryption algorithms so as to perform encryption/decryption smoothly with a low calculation capacity.

A transmission side of the service providing apparatus 100 and the specific terminal 10 may encrypt plain-data to be transmitted for encryption with the shared encryption key using an LEA.

Figure 9:
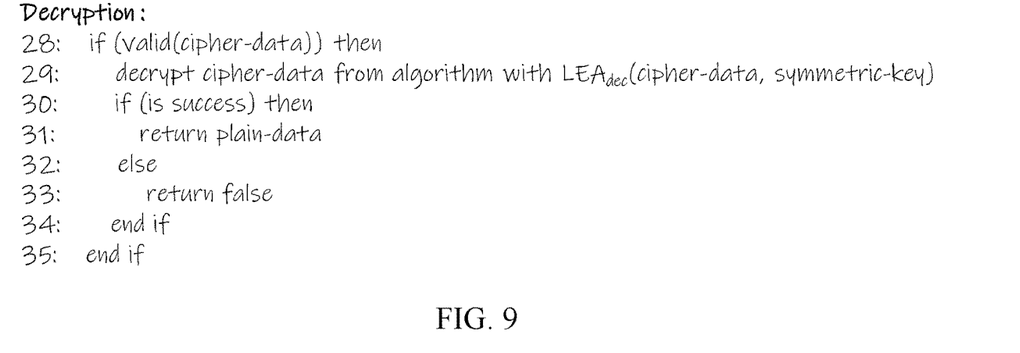

Further, as illustrated in FIG. 9, a reception side of the service providing apparatus 100 and the specific terminal 10 may receive cipher-data to check whether there is no problem in the data and decrypt the cipher-data using a shared encryption key matched with the transmission side and the LEA.

Various apparatuses and components described in the present specification may be embodied by a hardware circuit (for example, a CMOS based logic circuit), firmware, software, or combinations thereof. For example, the apparatuses and components may be embodied by using a transistor, a logic gate, and an electronic circuit in the forms of various electric structures.

The aforementioned contents can be corrected and modified by those skilled in the art without departing from the essential characteristics of the present invention. Accordingly, the various embodiments disclosed in the present invention are not intended to limit the technical spirit but describe the present invention and the technical spirit of the present invention is not limited by the following embodiments. The protection scope of the present invention should be construed based on the following appended claims and it should be appreciated that the technical spirit included within the scope equivalent to the claims belongs to the present invention.

What is claimed is:

1. A security service providing method for supporting a lightweight security scheme comprising:
   a synchronization step of performing, by a service providing apparatus, time synchronization with a specific terminal according to a predetermined synchronization protocol;
   an identification step of identifying, by the service providing apparatus, a previous block to be connected to a new block associated with an encryption key of the specific terminal in a pre-stored shared ledger used for a blockchain to generate the encryption key of the specific terminal;

a generation step of extracting, by the service providing apparatus, an existing key block hash value obtained by applying a hash value used for generating another encryption key related to another terminal, information related to the other encryption key including identification information of the other terminal and the other encryption key related to the other terminal, and a generation time of the existing key block to a predetermined hash algorithm in an existing key block which is included in the previous block and stores the information related to the other encryption key of the other terminal and generating the encryption key by applying an error coefficient according to a time difference from the specific terminal measured through the time synchronization and the existing key block hash value to a predetermined hash algorithm;

a transmission step of transmitting, by the service providing apparatus, the existing key block hash value to generate the encryption key in the specific terminal; and a security step of encrypting and transmitting, by the service providing apparatus, transmission data with the encryption key to the specific terminal generating the encryption key or decrypting reception data encrypted with the encryption key received from the specific terminal with the encryption key.

2. The security service providing method of claim 1, wherein the encryption key is a symmetrical key.

3. The security service providing method of claim 1, wherein the synchronization protocol is an Network Time Protocol (NTP).

4. The security service providing method of claim 1, further comprising:
   generating, by the specific terminal receiving the existing key block hash value from the service providing apparatus, the encryption key based on the existing key block hash value and the error coefficient measured in a process of performing the synchronization with the service providing apparatus.

5. The security service providing method of claim 4, wherein the generation step is configured by a step of generating, by the service providing apparatus, a first random number value obtained by applying the existing key block hash value extracted from the existing key block and the error coefficient according to the time difference measured through the time synchronization to the hash algorithm and a second random number value obtained by applying a predetermined unique set value to the hash algorithm again, and
   further comprises a step of generating, by the specific terminal, a first random number value generated by applying the existing key block hash value and the error coefficient received from the service providing apparatus and a second random number value obtained by applying the predetermined unique set value received from the service providing apparatus to the hash algorithm again and then verifying whether the generated encryption key is the same as the encryption key generated by the service providing apparatus.

6. The security service providing method of claim 1, further comprising:
   a step of generating, by the service providing apparatus, a new block to be connected to the previous block based on one or more transactions generated in relation to the encryption key of the specific terminal, generating a new key block including a new key block hash value obtained by applying the existing key block hash value used for generating the encryption key for the specific terminal when the new block is generated, a generation time of the new key block including the encryption key-related information including identification information of the specific terminal and the encryption key related to the specific terminal, and the encryption key-related information to the hash algorithm and including the new key block in the new block, and then registering the new block in the shared ledger so that the existing key block corresponding to the existing key block hash value included in the previous block and the new key block are connected to each other.

7. The security service providing method of claim 6, wherein the registration step further comprises a step of generating, by the service providing apparatus, a root hash value for determining the forgery of the new block based on one or more transactions generated in relation to the encryption key of the specific terminal for the generation period of the new block and a hash value for each of the one or more transactions generated in relation to data transmitted and received through communication with one or more other terminals and generating a block hash value for connecting the new block with the previous block based on the block hash value of the previous block and the root hash value to include the block hash value in the new block and then registering the new block in the shared ledger so as to be connected to the previous block.

8. The security service providing method of claim 1, further comprising:
   adding, by the service providing apparatus, discard information related to the encryption key to be discarded in a specific key block generated when the encryption key is discarded to the specific key block when the encryption key is deleted and discarded after the encryption key of the specific terminal is generated, calculating a key block hash value of the specific key block by applying the discard information to the hash algorithm together with a key block hash value for the key block before the specific key block included in the specific key block, identification information for each of one or more terminals corresponding to the specific key block, one or more different new encryption keys corresponding to the specific key block, and a generation time of the specific key block, setting a key block hash value reflected with the discard information in the specific key block and then registering and storing the specific key block including the discard information in the shared ledger, and generating a new encryption key corresponding to the specific terminal by performing the synchronization step, the identification step, the generation step, and the transmission step for the specific terminal in which the encryption key is discarded.

9. A security service providing apparatus for communicating with a plurality of different terminals via a communication network and supporting a lightweight security scheme, the security service providing apparatus comprising:
   a synchronization unit configured to perform time synchronization with a specific terminal according to a predetermined synchronization protocol;
   an encryption key generation unit configured to identify a previous block to be connected with a new block associated with an encryption key of the specific terminal in a pre-stored shared ledger used in a blockchain in order to generate the encryption key of the specific terminal, extract an existing key block hash value obtained by applying the hash value used for generating another encryption key related to another terminal, the information related to the other encryption key including the identification information of the other terminal and the other encryption key related to the other terminal, and the generation time of the existing key block to a predetermined hash algorithm in the existing key block which is included in the previous block and stores the information related to the other encryption key of the other terminal, generate an encryption key for the specific terminal by applying an error coefficient according to a time difference from the specific terminal measured through the time synchronization and the existing key block hash value to the predetermined hash value algorithm, and transmit the existing key block hash value so as to generate the same encryption key in the specific terminal; and an encryption/decryption unit configured to encrypt and transmit transmission data with the encryption key to the specific terminal generating the encryption key or decrypt reception data encrypted with the encryption key received from the specific terminal with the encryption key.

10. The security service providing apparatus of claim 9, further comprising:

a blockchain management unit configured to generate a new block to be connected to the previous block based on one or more transactions generated in relation to the encryption key of the specific terminal, generate a new key block including a new key block hash value obtained by applying the existing key block hash value used for generating the encryption key for the specific terminal when the new block is generated, a generation time of the new key block including the encryption key-related information including identification information of the specific terminal and the encryption key related to the specific terminal, and the encryption key-related information to the hash algorithm and include the new key block in the new block, and then register the new block in the shared ledger so that the existing key block corresponding to the existing key block hash value included in the previous block and the new key block are connected to each other.

* * * * *